United States Patent [19]

Deeter et al.

[11] 3,967,909

[45] July 6, 1976

[54] LATCHING AND LATCH RELEASING MECHANISM FOR AUGER STRING COUPLINGS

[75] Inventors: Ronald C. Deeter, Malvern; Thad A. Lora; John M. Pozniko, both of Salem, all of Ohio

[73] Assignee: The Salem Tool Company, Salem, Ohio

[22] Filed: Nov. 7, 1974

[21] Appl. No.: 521,637

[52] U.S. Cl. ............................ 403/322; 403/328; 175/85
[51] Int. Cl.[2] .................................... F16D 7/00
[58] Field of Search ............ 175/85, 52; 403/322, 403/324, 328; 299/55, 56, 57

[56] References Cited
UNITED STATES PATENTS

| | | | |
|---|---|---|---|
| 3,278,236 | 10/1966 | Adams et al. | 299/55 |
| 3,685,865 | 8/1972 | Young | 403/316 |
| 3,698,768 | 10/1972 | Delli-Gatti | 175/85 X |

Primary Examiner—Andrew V. Kundrat
Attorney, Agent, or Firm—Bosworth, Sessions & McCoy

[57] ABSTRACT

A lever-operated latching device for securing in endwise coupled relation a socket and mating shank of axially aligned auger sections of an auger mining machine, and a mechanism for automatically releasing essentially simultaneously a plurality of lever-operated latching devices of auger sections located in generally coplanar parallel adjacent alignment, the operating levels of the levers of which latching devices are subject to displacement from an intended coplanar relationship. The latching device is designed to be of minimum radial dimension so as to fit in a limited radial cross section of hole bored by the auger machine, and includes a latch pin that reciprocates in a passage formed in the socket between an extended position in latching engagement with the shank and a retracted unlatching position. The pin is biased by a spring toward its extended position and is retractable by a lever that engages a retractor element on the pin and which also has limit means that retains the pin in its extended position against the force of the spring. The mechanism for releasing essentially simultaneously a plurality of such lever-operated latching devices of adjacent auger sections comprises an unlatching member reciprocable toward and away from the levers between a retracted position and an extended position whereat contacting portions of the unlatching member can engage and pivot each of the levers to unlatch the devices even though the levers of one or more latching devices or auger sections are displaced from their desired coplanar relationship relative to the levers of other latching devices.

12 Claims, 14 Drawing Figures

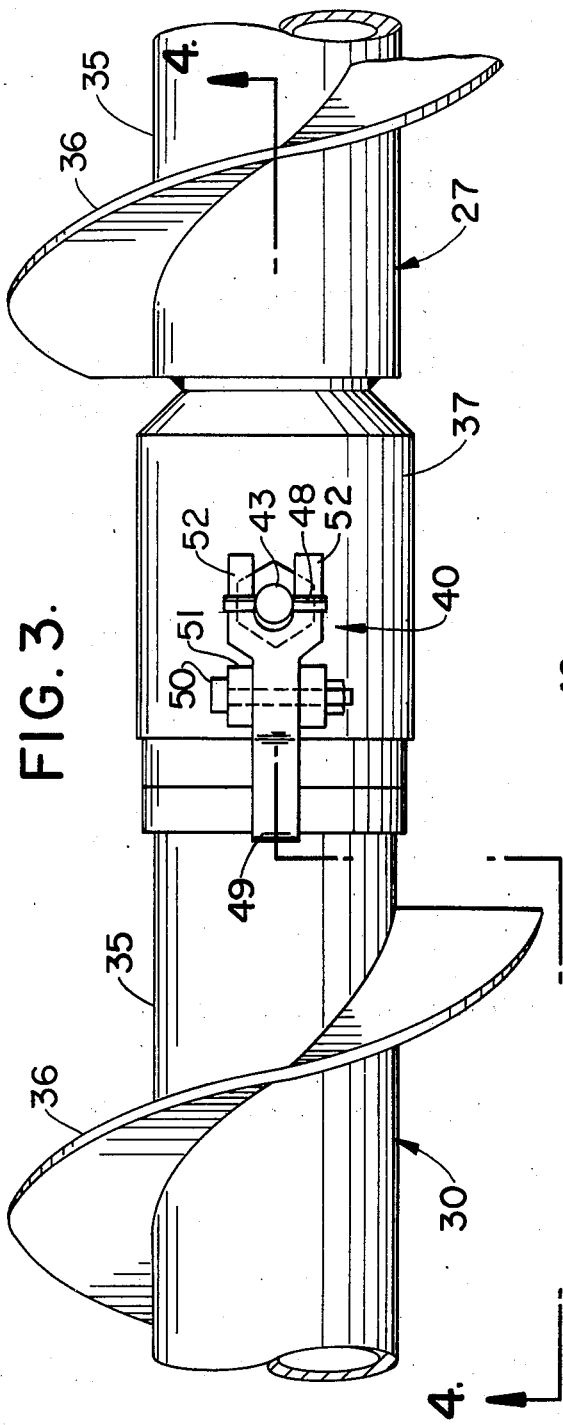
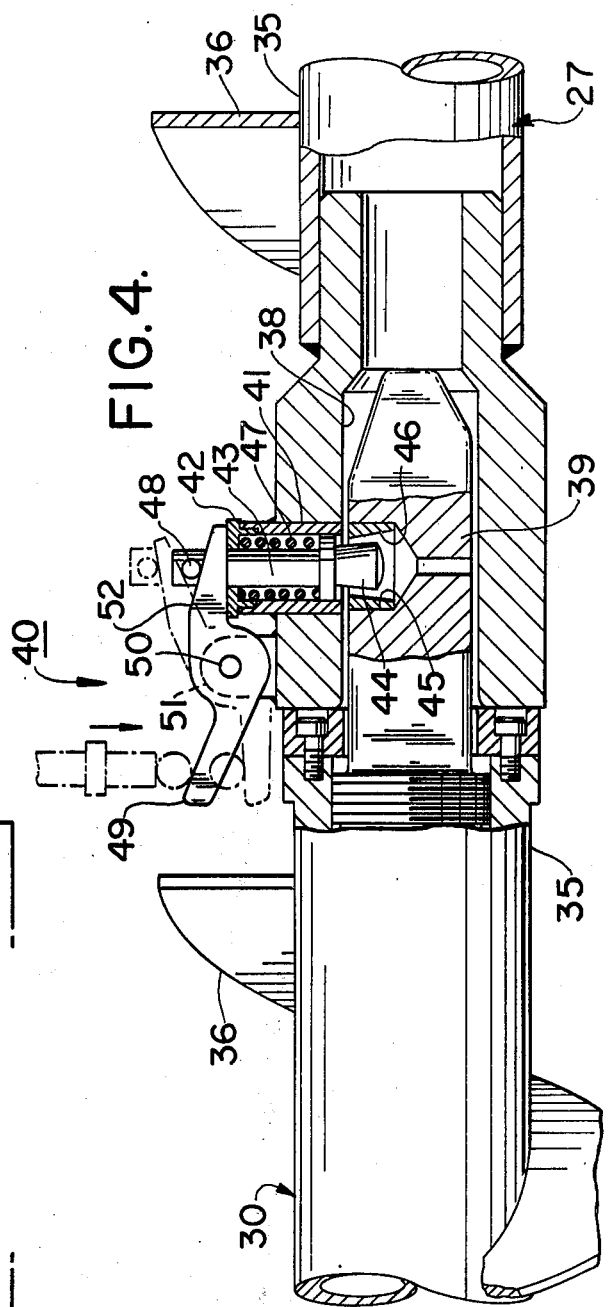

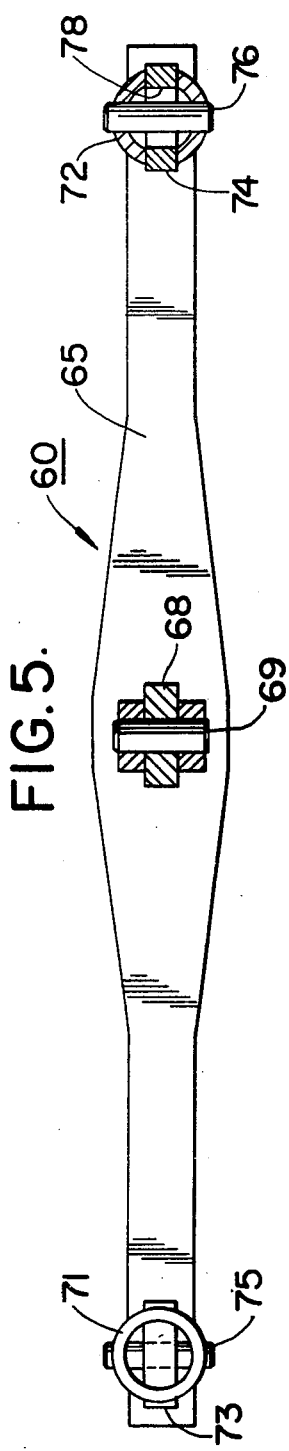
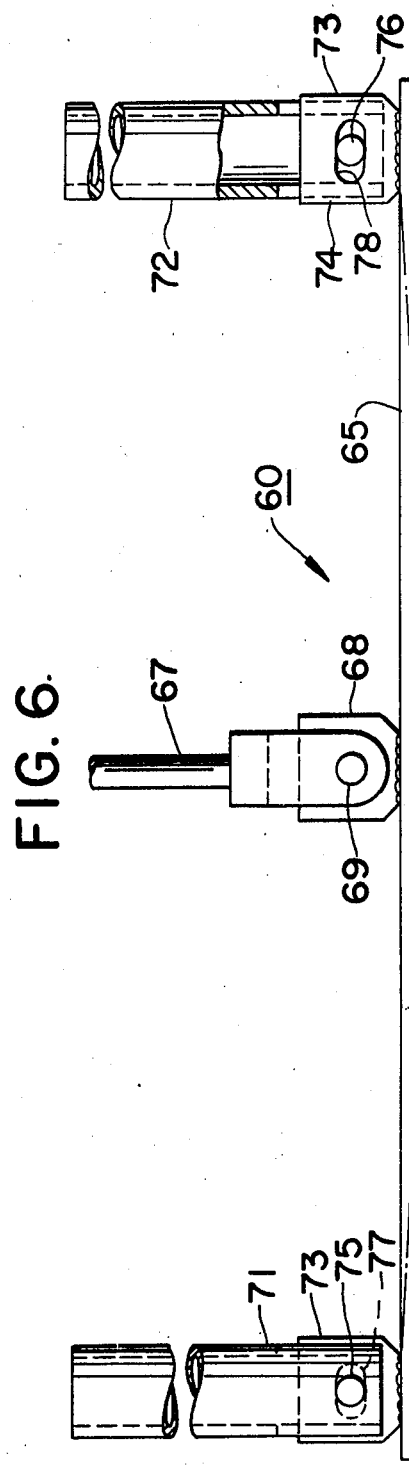
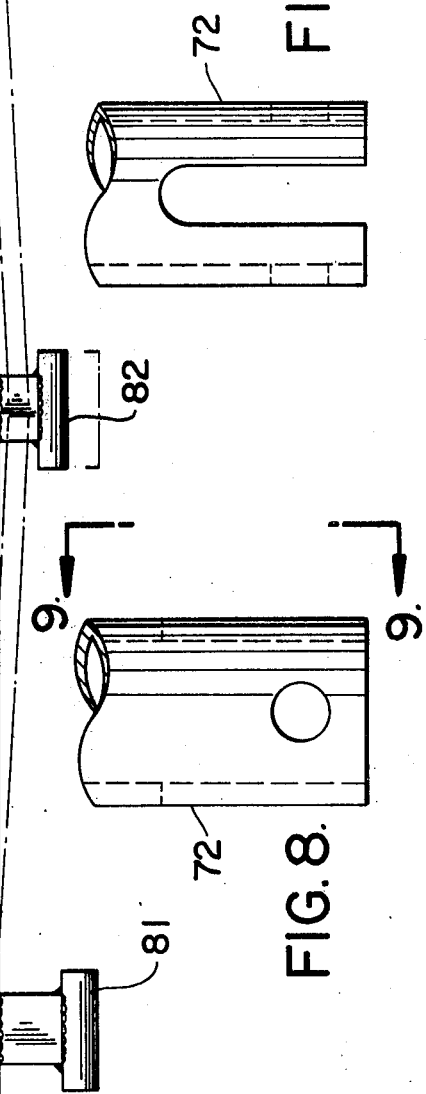
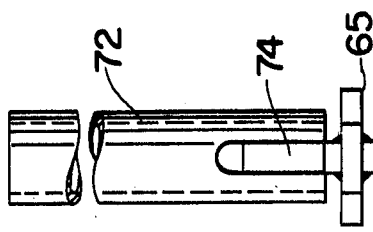

LATCHING AND LATCH RELEASING MECHANISM FOR AUGER STRING COUPLINGS

BACKGROUND OF THE INVENTION

This invention relates to latching devices for securing shank-and-socket type couplings such as for connecting auger sections end-to-end to form strings of axially aligned auger sections used in auger mining machines to rotate a cutting head and progressively drive an auger assembly forward into a mineral deposit while removing the mined material by the auger strings. More particularly, the invention relates to a latching device of minimum radial dimension relative to the auger section to fit within the cross sectional limits of the hole being cut by the auger machine, to a mechanism for automatically releasing a plurality of such latching devices used with a plurality of parallel, generally coplanar auger strings formed of separate auger sections coupled together end-to-end in axially aligned relation.

The invention has particular utility in connection with auger machines for mining lateral seams or veins of mineral, such as coal, and especially to a machine usually located in an open pit that advances a rotary cutting head progressively laterally into the seam of coal while conveying the dislodged coal rearwardly from the cutting head by helical auger flights in known manner. Additional auger sections are added as needed depending upon the extent of the advance of the cutting head into the coal seam, to form a string corresponding to the depth of the hole.

Many such auger mining machines have multiple rotary cutting heads journaled in a rigid frame with their respective axes parallel and generally coplanar. The resulting assembly is advanced as a unit into the earth to cut a relatively wide hole as the mining progresses. Where multiple cutting heads are used, normally two or more separate strings of auger sections extend from the main body of the machine to the cutting head assembly to rotate the plurality of cutting heads simultaneously and to exert a thrust to advance the cutting heads into the mineral deposit to be mined.

New developments in the economics of coal mining have created conditions where it is now feasible to mine coal from relatively thin seams that in the past would have been bypassed as being economically unfeasible to mine. The reduced diameters of the cutting heads and auger flights for mining such thin seams have necessitated the provision of associated equipment so that it will fit within the cross section of the hole through which the auger strings are advanced. This associated equipment includes the devices for latching the couplings between axially aligned auger sections in the auger strings.

Normally the interconnected auger sections have a socket portion on one end of each section and a cooperating mating shank on the opposite end. The shank fits into the socket recess of the next section and a latch pin extending transversely of the auger axis is passed through the wall of socket portion and into a recess formed in the shank. Such a connection is illustrated and described in U.S. Pat. No. 3,278,236.

A lever is usually provided for retracting the latch pin from the shank to permit uncoupling of the sections, as when the cutting head is being withdrawn from the hole at completion of the mining of the seam. As the auger string is withdrawn, the auger sections of each string must be sequentially removed from the machine by uncoupling the sections and lifting the rearmost section from the machine.

Prior art devices have often necessitated the retraction of the latch pin by a worker who holds the pin while the shank and socket are uncoupled from one another. This is an awkward and time-consuming operation particularly when auger sections of a plurality of strings must be unlatched, and involves certain danger to the worker. Mechanical uncoupling mechanisms have been heretofore provided for the purpose of depressing unlatching levers of a plurality of generally parallel auger sections and hold them depressed in unlatching position during the uncoupling operation, but problems arise when the levers of the unlatching devices of generally parallel auger sections are out of their desired essentially coplanar alignment, as because the axes of such auger sections are not in essentially coplanar relationship because one or more are deflected out of such relationship because they have more or less mined material around them than others, or because of misalignment of the large auger mining machine at the job site, or because deflection of the auger guide that has caused the auger axes to displace from the desired coplanar relationship. The unlatching levers may also be displaced out of their desired essentially coplanar relationship because they have not been stopped in the same angular position, preferably in the uppermost position, on halting of rotation of the auger strings. Even though the driving means for the auger strings is geared to rotate them and halt their rotation simultaneously, occasionally the auger sections to be unlatched do not all halt in the same angular positions, as due to play in the apparatus or in the connections of the auger sections as due to wear.

For such reasons, an uncoupling member intended to operate three unlatching levers simultaneously might unlatch only two while another one that is out of coplanar relationship with the others is not completely depressed, so all auger sections are not simultaneously unlatched, thus necessitating manual unlatching of the unlatched sections with attendant delay and possible danger.

The present invention resolves the difficulties indicated above and affords other features and advantages heretofore not obtainable.

SUMMARY OF THE INVENTION

It is among the objects of the invention to reduce the space occupied by a latching device for a coupling between a socket and a mating shank, as of longitudinally connected auger sections, to permit the latching device to be effective even though moved through relatively small distance.

It is another object to provide an unlatching device for endwise coupled auger sections that extend radially a substantially lesser distance than prior unlatching devices, and that fits within the cross section of the hole through which such sections pass even though the hole is of relatively small diameter.

Another object of the invention is to provide means for essentially simultaneously unlatching a plurality of latching devices associated with a plurality of generally parallel adjacent couplings that are essentially aligned in coplanar relation and which latching devices have operating means subject to displacement from their intended coplanar relationship.

3

These and other objects are accomplished by the unique latching device and associated unlatching mechanism embodied in the present invention.

The latching device of the invention is located on a socket portion that has a passage extending transversely through its wall, and a socket recess adapted to receive a shank. The passage has a retainer element at one end that defines an opening. A latch pin extends through the passage and outwardly through the opening of the retainer means. The latch pin is reciprocable between an extended position in latching engagement with the shank and a retracted unlatching position. The latch pin is biased by a spring located in the passage and that bears against the inside of the retainer means to urge the pin towards its extended latching position. Externally of the passage, the pin has retractor means.

The pin is retracted by a lever pivotally mounted on the socket with an operating arm at one end and a pin-engaging arm on the other end located between the retractor means on the pin and the retainer means. The lever is pivotable between an unlatching position wherein its pin-engaging arm lifts the pin, by pressure against the retractor means, to its outward retracted position, and a retaining position wherein the pin-engaging arm rests against the retainer means and prevents further inward movement of the retractor means so as to limit the rearward extended position of the pin. This arrangement minimizes the outward projection of the latch pin so that the entire device occupies a minimum amount of space.

The invention also embodies a mechanism for simultaneously releasing a plurality of adjacent lever-operated latching devices such as on couplings between interconnected auger sections in essentially parallel strings wherein the strings are in generally coplanar alignment and the levers of the latching devices are subject to displacement from their intended coplanar relationship. The mechanism includes an unlatching member reciprocable toward and away from the levers between a retracted position and an extended position wherein certain lever-contacting portions of the unlatching member engage and move each of the levers to simultaneously unlatch the devices. The unlatching member has means resiliently biasing at least two of the contacting portions thereof toward their respective levers so that extention movement of the unlatching member may continue beyond a position whereat certain of the devices are unlatched and until all of the latch pins are retracted even though the levers of certain latching devices are displaced from their coplanar relationship.

BRIEF DESCRIPTION OF THE DRAWINGS

FIG. 3 is a fragmentary plan view to a still larger scale illustrating a latching device embodying the invention;

FIG. 4 is a fragmentary sectional view taken on line 4—4 of FIG. 3 and to the same scale;

FIG. 5 is a sectional view on line 5—5 of FIG. 2 but to a larger scale;

FIG. 6 is a fragmentary front elevation illustrating the unlatching mechanism of FIG. 5 and to the same scale;

4

Figure 2:
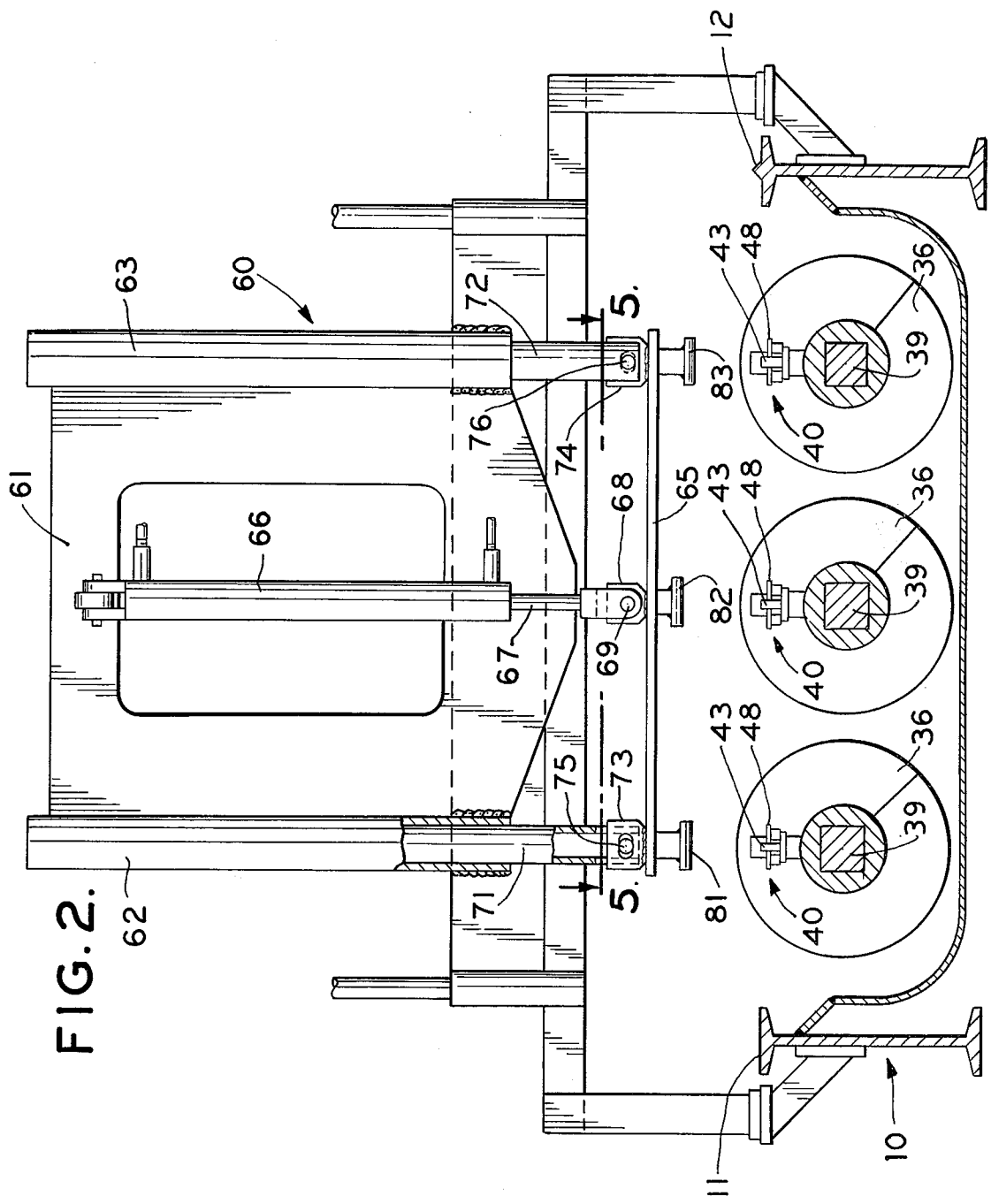
FIG. 2 is a vertical section on a larger scale taken on line 2—2 of FIG. 1.
Figure 10:
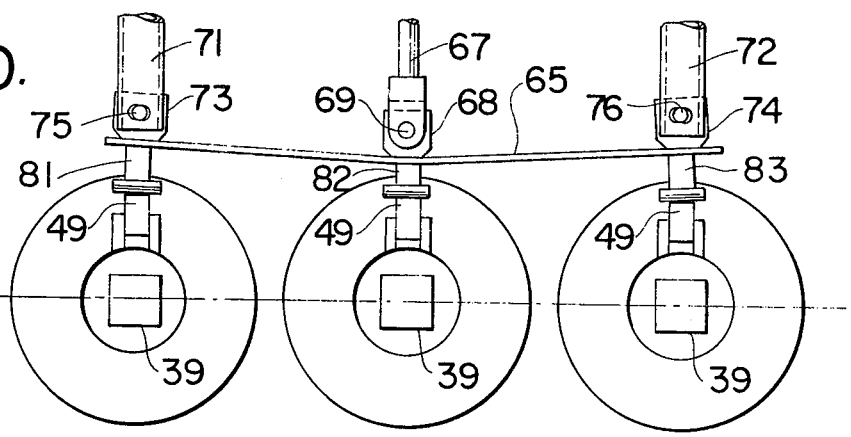
Figure 11:
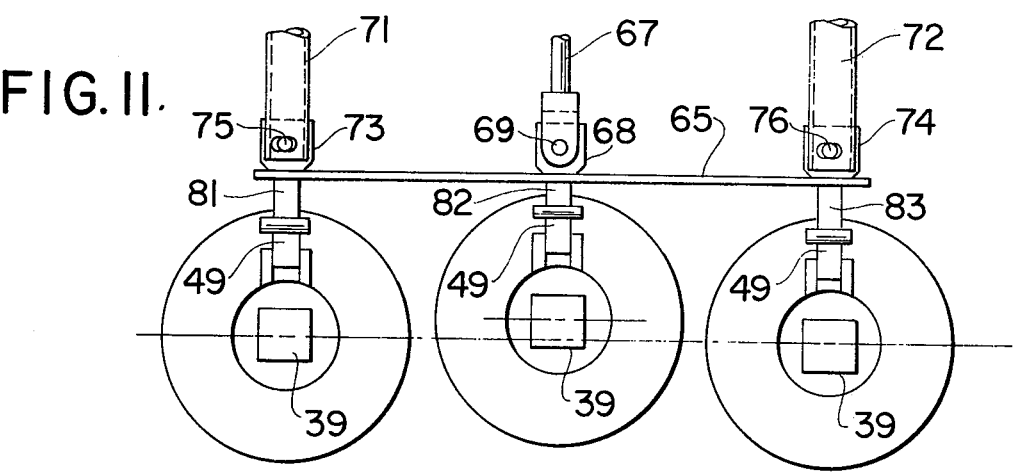
Figure 12:
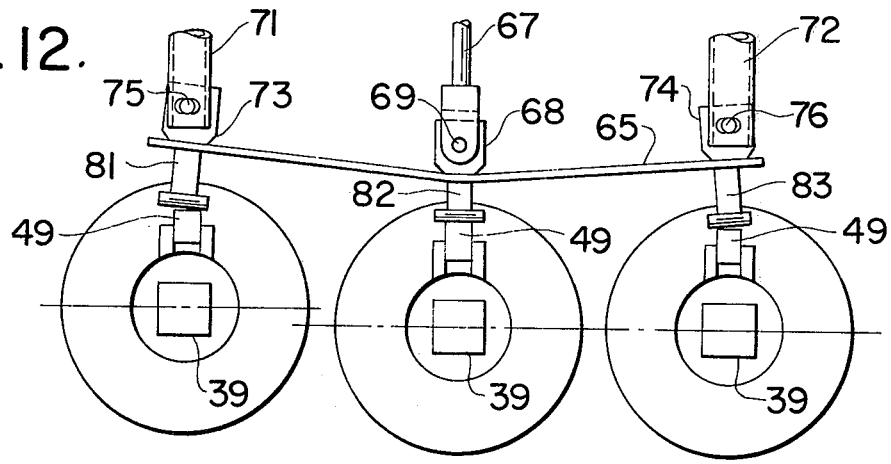
Figure 13:
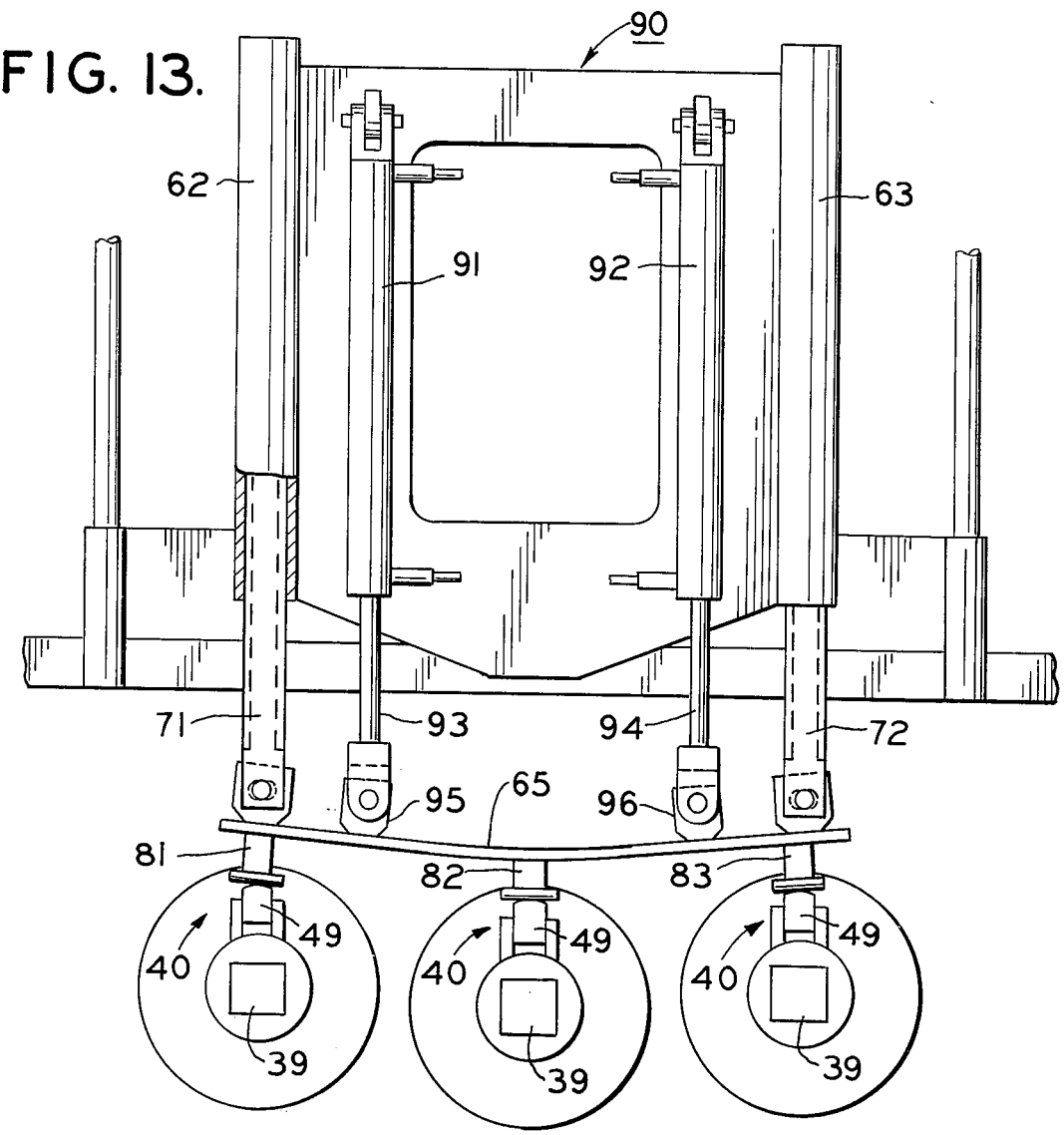
Figure 14:
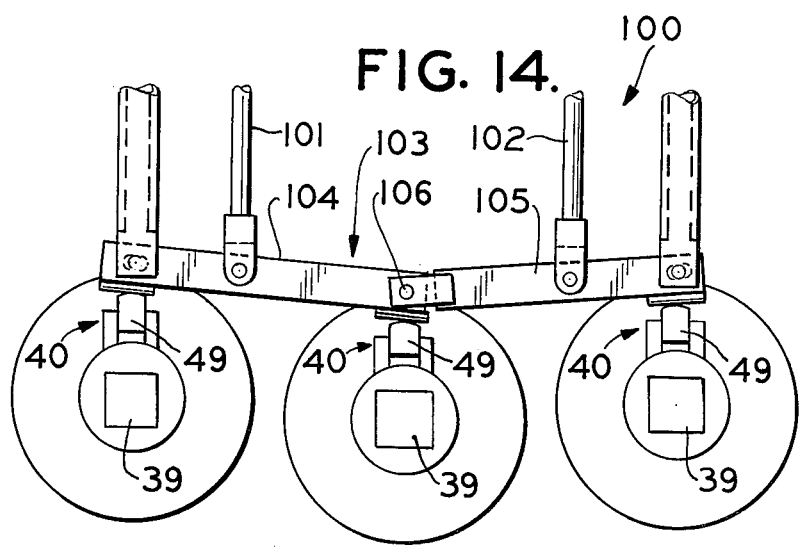

FIG. 7 is a broken side elevation illustrating the unlatching mechanism of FIG. 6 and to the same scale;

FIG. 8 is a fragmentary elevation on an enlarged scale illustrating one of the compensating tubes that are located on opposite ends of the unlatching member of FIGS. 5 and 6;

FIG. 9 is a fragmentary side elevation of the compensating tube of FIG. 8 from line 9—9 of FIG. 8;

FIGS. 10 through 12 are fragmentary elevational views partly in diagrammatic form and to the scale of FIG. 2 illustrating three different alignment conditions of latching mechanisms that can be engaged and operated by the unlatching mechanism of FIGS. 11 and 12 are out of their predetermined coplanar relationship with one another; and FIGS. 13 and 14 are fragmentary elevational views in diagrammatic form, similar to FIGS. 10 through 12, illustrating alternate forms of unlatching mechanisms embodying the invention.

DESCRIPTION OF THE PREFERRED EMBODIMENT

Figure 1:
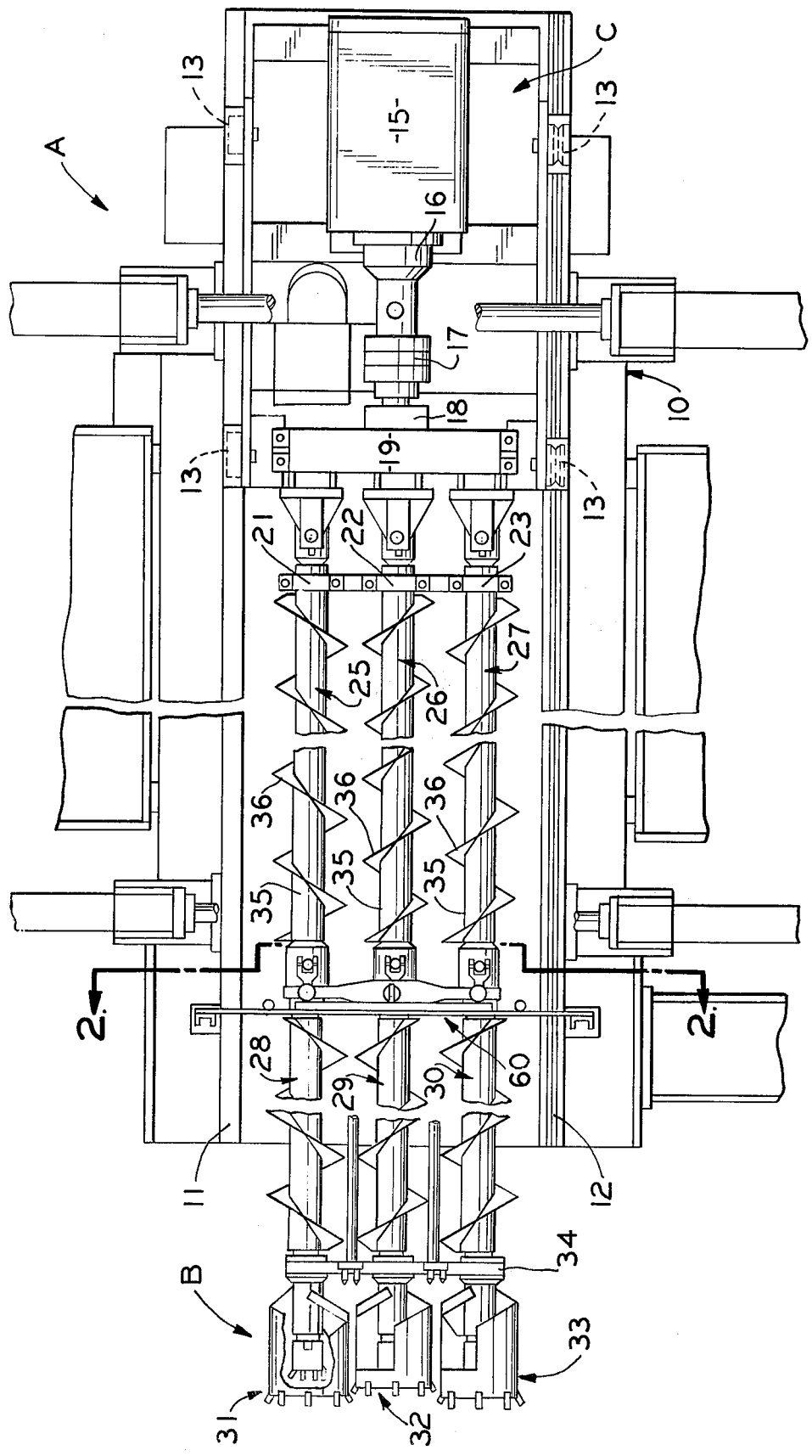
FIG. 1 is a broken plan view to a greatly reduced scale of an auger mining machine embodying the invention useful for mining coal and having three auger strings connected to a single driving carriage.

In the drawings, particularly in FIGS. 1 and 2, there is shown one auger-mining machine A for mining minerals such as coal from an open pit. The machine A has a multiple cutting head assembly B which is advanced laterally into a seam of coal by a reciprocable carriage C. The machine A has a main frame 10 of conventional construction with a pair of parallel ways or rails 11 and 12 thereon along which the carriage C travels on wheels 13.

An internal combustion engine 15, constituting a power source for rotating the augers, is mounted on the carriage C and drives the below-discussed augers through a power train including a clutch 16, a flexible coupling 17 and a shiftable transmission 18. The output shaft of the coupling 17 is operatively connected to the transmission 18 and gear box 19 adapted to drive three driving heads 21, 22 and 23 forming part of carriage C.

The driving heads are each connected to one of three parallel auxiliary auger sections 25, 26 and 27 which are axially coupled to another three parallel auger sections 28, 29 and 30 forming part of three auger strings extending to the three individual parallel coplanar cutting head units 31, 32 and 33 of the cutting head assembly B, which may be of known construction. Assembly B shows three parallel cutting head units 31, 32 and 33 journaled in a rigid frame 34 for rotation about axes in a generally common plane.

The auxiliary auger sections 25, 26, 27, 28, 29 and 30 each comprise, as shown in FIGS. 3 and 4 which show portions of sections 27 and 30, an elongated body 35 with external helically vaned flights 36 secured thereon as by welding, a socket portion 37 having a square cross-section socket recess 38 at the forward end of body 27, and a square cross-section shank 39 at the rearward end of body 35 adapted to slidably but non-rotatably fit into recess 38. Thus, pairs of axially aligned auger section may be interconnected or coupled to one another by inserting the square shank 39 of one section into the mating socket recess 38 of the other section and secured against substantial relative axial movement.

At the start of the mining operation as shown in FIG. 1, the cutting head units 31, 32, and 33 of cutting head assembly B are respectively coupled coaxially aligned end to end and coupled directly to the three auger sections 25, 26, 27 that are connected to the driving heads 21, 22, and 23. However, after the assembly B and its cutting head units 31, 32 and 33 have advanced sufficiently into the vein of mineral to be mined, the driving heads are disconnected, the carriage C is retracted and three new auger sections are inserted and connected to the sockets of the former rearmost auger sections in the string. As this progressive adding of additional auger sections continues, a relatively long string of auger sections is constructed. On withdrawal of cutting head assembly B from the hole, the rearmost auger sections are sequentially removed from each string.

To secure the coupling between the auger sections there is provided a novel latching device 40 (FIG. 2) embodying the invention. In the present instance the cutting head assemblies 31, 32 and 33 cut three circular holes of about a 16 inch diameter. For this reason the space available for the latching device is rather limited and of course as it must be capable advancing forward with the auger sections through a hole having only a 16 inch diameter. The unique construction of the latching device in accordance with the invention minimizes the space required for effective latching and thus is capable of meeting the requirements of relatively small diameter mining equipment.

Each latching device 40 comprises a cylindrical housing 41 fixed in a transverse bore formed in the socket 38 of the respective forward end of the auger section which in the case of FIGS. 3 and 4 is the section 27. The cylindrical housing 41 has a retainer 42 fixed to its outer end and which defines a central circular opening adapted to receive a latch pin 43 which reciprocates in the housing 41 and extends through the opening in the retainer 42 and outward from the socket 38.

The latch pin 43 has a head 44 having an outer surface tapered inwardly toward the outer end of the pin adapted to extend into a latch pin hole 45. Hole 45 is formed in the mating square shank 39 of the auger section 30. A cylindrical liner sleeve 46, secured in the shank, hole 45 has its inner surface tapered mounting toward the outer end of the hole to cooperate with the tapered surface of the latch pin head to prevent any accidental unlatching that might occur from the forces involved during the mining operation or on withdrawal of the auger strings. A coil spring 47 located in the housing 41 and compressed between the latch pin head 44 and the interior face of the retainer 42 urges the latch pin 43 to its extended latching position wherein it extends into the shank 39.

It will be noted that the shank 39 has a tapered outer end, and that during the coupling operation the movement of the shank 39 into the socket 38 results in engagement between the tapered end of the shank 39 and the latch pin 43 and moves it upwardly against the force of this spring 47 until the pin 43 becomes aligned with the latch pin hole 45 at which time the spring forces the latch pin head 44 into latching engagement with the shank 39. Accordingly the coupling operation results in an automatic latching of the aligned auger sections in the particular auger string.

The latch pin 43 has a laterally extending retractor pin 48 secured in its upper end to permit retraction of the latch pin 43 when the sections are to be uncoupled. The retraction of the pin against the force of the spring 47 is accomplished by a lever having an operating arm 49 at one end and connected by a pivot pin 50 to a clevis 51 welded to the socket 38. The lever has another arm 52 with a bifurcated end.

As indicated in FIGS. 3 and 4 the bifurcated retractor arm 52 extends on either side of the latch pin between the opposite ends of the retractor pin 48 and the outer face of the retainer 42, thus, when the retractor arm 52 is in its normal retaining position it blocks further extension of the latch pin 43 into the shank 39 and thus serves as a positive stop acting to resist the force of the spring 47 tending to urge the latch pin 43 into further extension. When the operating arm 49 is depressed the retractor arm 52 lifts the retractor pin 48 together with the latch pin 43 to retract the head 44 of the latch pin 43 from the square shank 39 and permit the shank 39 to be moved axially out of the socket to unlatch the two interconnected auger sections so that they may be axially separated, thus uncoupling them.

In accordance with another aspect of the invention the auger mining machine A is provided with a means for unlatching all three latching devices 40 simultaneously from a remote location. Thus, an operator may control the unlatching when desired from a position remote from the particular couplings. Manual operation of the lever operating arms 49 would require that the operator hold the operating arms 49 in their unlatching position until the uncoupling is complete; this would be difficult, time consuming, and possibly dangerous.

The unlatching mechanism is best illustrated in FIGS. 2 and 5 through 12 which show an uncoupling assembly 60 forming a part of the auger-type mining machine A. The assembly 60 includes a generally reactangular flat frame 61 pivotally mounted to the frame of the machine A. The frame 61 has two parallel vertical guide sleeves 62 and 63 welded to its opposite sides (FIG. 2). A flexible resilient uncoupling bar 63 is reciprocated toward and away from the latching mechanisms 40 by a fluid cylinder 66 connected at one end to the frame 61 and having its piston rod 67 connected by a pivot pin 69 to a bracket 68 welded to the uncoupling bar 65.

A pair of cylindrical slide tubes 71 and 72 are slidably received in the guide sleeves 62 and 63 and have their lower ends both pivotally and slidably connected to upright end brackets 73 and 74 welded to the flexible uncoupling bar 65. The unique connection between the slide tubes 71 and 72 and the welded end brackets 73 and 74 is best illustrated in FIGS. 6 through 9. Pins 75 and 76 extend laterally through the respective slide tubes 71 and 72 and through elongated slots 77 and 78 formed in the brackets 73 and 74. Thus the brackets 73 and 74 are capable of limited pivotal movement relative to the slide tubes 71 and 72 within the limits defined by the ends of the slots 77 and 78.

Welded to the lower side of the uncoupling bar 65 are three actuators 81, 82 and 83 which are positioned to engage and depress the operating arms 49 of the levers of the three latching devices 40.

It will be noted from FIG. 6 that when the flexible uncoupling bar is in its normal unflexed position the bottoms of the side actuators 81 and 83 are at a lower level or in a lower plane than the bottom of the intermediate actuator 82. During the downward movement of the rod 67, however, the actuator 82 will continue its downward movement after the actuators 81 and 82 have engaged their respective operating arms 49; these operating arms 49 resist the extension movement, however, until further downward movement of rod 67 causes flexing of the uncoupling bar 65 and thus storage of sufficient energy to operating the particular latches of the actuators 81 and 83 respectively. As indicated in FIG. 6 in dashed lines, flexing of the bar 65 results in slight pivotal movement of the brackets 73 and 74 relative to the ends of the slide tubes 71 and 72. Also the geometry involved requires some relative movement between the pins 75 and 76 extending transversely through the slide tubes 71 and 72 and the respective brackets 73 and 74 and such relative movement is accomodated by the slots 77 and 78.

The function of the uncoupling assembly 60 and its mode of operation under different possible operational conditions are best illustrated in FIGS. 10 through 12. As indicated above under some conditions the axes of the three auger strings may become displaced from their common plane and this results in the operating levers 49 for the latching devices 40 being out of their predetermined position.

Referring to FIG. 10 it will be seen that the axes of all three auger sections are in coplanar alignment and identical, latching mechanisms of all three auger sections are in identical coplanar relationship as the upper portions of the auger sections so the corresponding portions of their operating levers are in coplanar relationship. Under these circumstances extension or downward movement of the piston rod 67 results in initial engagement between the actuators 81 and 83 and the operating arms 49 of the respective latching mechanisms 40 of the side auger sections which in the illustrated case are sections 28 and 30. While at the point of initial contact the actuator 82 is spaced above the operating arm 49 of its respective latching device 40 for central auger section 29, further extension of the rod 67 from the cylinder 66 results in flexing of the uncoupling bar 65. After certain energy is stored as result of this flexing, the actuators 81 and 83 will depress their respective operating levers 49 and unlatch the respective latching mechanisms 40. After the respective operating levers 49 are depressed further extension of the piston rod 67 will result in further flexing until the actuator 82 engages and depresses the operating lever 49 of its respective latching device 40 so that all three latching devices will be unlatched. At this time the uncoupling of the interconnected auger sections may be accomplished.

FIG. 11 illustrates the condition where the central auger section is out of coplanar relation with and spaced above the plane of the two end sections. When this occurs the actuators 81, 82 and 83 will engage the operating levers of their respective latching devices almost simultaneously without any initial flexing of the uncoupling bar 65. Thus the extension of the piston rod 67 will cause generally simultaneous unlatching of the devices 40 for the purposes of uncoupling the auger sections.

FIG. 12 illustrates the condition where the axis of one end auger section is out of coplanar relation with and spaced above the plane of the other two sections. Under these circumstances it will be seen that the actuator 81 engages the operating lever 49 of its respective latching device before engagement of the other two actuators 82 and 83. Thus the unlatching will first occur at the latching device cooperating with the actuator 81 and 82 and after the respective operating lever 49 is depressed further extension will only cause further flexing of the left hand end of the uncoupling bar 65 until the other two actuators have engaged and depressed the operating levers of their respective latching devices.

These three FIGS. 10, 11 and 12 illustrate typical situations where a misalignment of the axes of the generally parallel auger sections occur so as to displace them from their predetermined coplanar alignment. With the unique construction of the uncoupling assembly 60 such displacement is easily accommodated and the unlatching is consistently and reliably accomplished.

FIG. 13 illustrates an unlatching mechanism 90 embodying an alternate form of the invention wherein two fluid cylinders 91 and 92 in lieu of the single cylinder 66 for the purpose of reciprocating the flexible unlatching bar 65. The piston rods 93 and 94 of the cylinders 91 and 92 are pivotally connected to a pair of brackets 95 and 96 welded to the bar 65. In other respects the construction is the same as that of the unlatching mechanism 60.

With this arrangement the unlatching function is accomplished in substantially the same manner as with the embodiment of FIGS. 1 to 12, however, additional force is provided to overcome possible resistance resulting from build up of dust and debris in the latch housing. A particular advantage of this arrangement is that it provides a more equal force applied to all three latch levers regardless of the displacement of the auger strings.

FIG. 14 illustrates another unlatching mechanism 100 embodying still another alternate form of the invention wherein two fluid cylinders with piston rods 101 and 102 are used in a manner similar to that shown in FIG. 13 but wherein an articulated unlatching bar 103 is used instead of the flexible unlatching bar 65. The unlatching bar 103 has two interconnected lengths 104 and 105 that are pivotally connected to one another by a hinge pin 106.

As in the case of the unlatching mechanism of FIG. 13, this embodiment provides a more equal force to all three latch levers, regardless of the displacement of the auger strings. Also this arrangement affords greater lever operating force as compared with the embodiment of FIG. 13.

While the invention has been shown and described with respect to a specific embodiment thereof this is intended for the purpose of illustration rather than limitation and other variations and modifications of the specific devices herein shown and described will be apparent to those skilled in the art all within the intended spirit and scope of the invention. Accordingly the patent is not to be limited to the specific devices herein shown and described nor any other way that is inconsistent with the extent to which the progress in the art has been advanced by the invention.

We claim:
1. Apparatus for simultaneously releasing a plurality of adjacent couplings between two interconnected members wherein a plurality of said two interconnected members and their respective couplings are adjacent one another in lateral alignment and subject to displacement from an intended coplanar relationship, comprising:
   a latch pin for each coupling, mounted on one of the interconnected members of each coupling and adapted for reciprocating movement between a latching position in engagement with said other member and a retracted unlatching position out of engagement with said other member,
   resilient means biasing each latch pin to said latching position, a lever for each latch pin pivotally mounted on said one member, operatively connected to its respective latch pin and having an operating arm adapted when depressed, to move said latch pin to its retracted position, unlatching means reciprocable toward and away from said operating arms between a retracted position and an extended position wherein said unlatching means engages and pivots each of said operating arms to unlatch each of said couplings, said unlatching means being provided with means to allow it to flex adequately to accommodate variation in the locations of said operating arms relative to one another out of a common plane so that extension movement of said unlatching means continues beyond a position whereat certain of said latch pins are retracted until all of said latch pins are retracted even though said latch pins are displaced from their predetermined coplanar position, and means for operating said unlatching means.

2. Apparatus as defined in claim 1 in which said unlatching means comprises a plurality of bar members connected end-to-end.

3. Apparatus as defined in claim 1 wherein said means for operating said unlatching means comprises two parallel fluid cylinders operatively connected to said unlatching member at symmetrically spaced locations.

4. Apparatus as defined in claim 3 wherein said unlatching means comprises a flexible resilient metal bar.

5. Apparatus as defined in claim 3 wherein said unlatching means comprises two rigid bar elements pivotally connected end-to-end at a pivot axis perpendicular to the direction of reciprocation of said unlatching member, each of said fluid cylinders being operatively connected, one to each of said bar element intermediate the end thereof.

6. Apparatus as defined in claim 1 wherein said unlatching means comprises a flexible resilient bar.

7. Apparatus as defined in claim 6 wherein said means for operating said latching means comprises a fluid cylinder and piston, operatively connected to said bar at the central portion thereof.

8. Apparatus as defined in claim 7 wherein said bar is adapted to unlatching three of said adjacent couplings and wherein said bar has three lever engaging elements, comprising two end elements and a central element, said end elements being in a line spaced below said central element when said bar is in its unflexed condition.

9. Apparatus as defined in claim 7 including guide means operatively connected to the opposite ends of said bar.

10. Apparatus as defined in claim 9 wherein said guide means comprises at each end portion of said bar, a guide tube mounted in a fixed location relative to said bar and a slide member pivotally connected to the end portion of said bar and slidably received in said guide tube.

11. Apparatus for simultaneously releasing a plurality of adjacent couplings between two interconnected members wherein a plurality of said two interconnected members and their respective couplings are adjacent one another in lateral alignment and subject to displacement from an intended coplanar relationship, comprising:

a latch pin for each coupling, mounted on one of the interconnected members of each coupling and adapted for reciprocating movement between a latching position in engagement with said other member and a retracted unlatching position out of engagement with said other member, spring means biasing each latch pin to said latching position, a lever for each latch pin pivotally mounted on said one member, operatively connected to its respective latch pin and having an operating arm adapted when depressed, to move said latch pin to its retracted position, a flexible unlatching member reciprocable toward and away from said operating arms between a retracted position and an extended position wherein said unlatching member engages and pivots each of said operating arms to unlatch each of said couplings, said unlatching member being adapted to flex to accommodate variations in the locations of said operating arms relative to one another whereby extension movement of said uncoupling member continues beyond a position whereat certain of said latch pins are retracted until all of said latch pins are retracted even though said latch pins are displaced from their predetermined coplanar position, three lever engaging elements on said unlatching member, said elements comprising two end elements and a central element, said end element being in a line spaced below said central element when said unlatching member is in its unflexed condition, and a fluid cylinder and piston operatively connected to said unlatching member at the central portion thereof for operating said unlatching member to unlatch three of said adjacent couplings.

12. Apparatus for simultaneously releasing a plurality of adjacent couplings between two interconnected members wherein a plurality of said two interconnected members and their respective couplings are adjacent one another in lateral alignment and subject to displacement from an intended coplanar relationship, comprising:

a latch pin for each coupling, mounted on one of the interconnected members of each coupling and adapted for reciprocating movement between a latching position in engagement with said other member and a retracted unlatching position out of engagement with said other member, spring means biasing each latch pin to said latching position, a lever for each latch pin pivotally mounted on said one member, operatively connected to its respective latch pin and having an operating arm adapted when depressed, to move said latch pin to its retracted position, a flexible unlatching member reciprocable toward and away from said operating arms between a retracted position and extended position wherein said unlatching member engages and pivots each of said operating arms to unlatch each of said couplings, said unlatching member comprising two rigid bar elements pivotally connected end-to-end at a pivot axis perpendicular to the direction of reciprocation of said unlatching member, said unlatching member being adapted to flex to accommodate variation in the locations of said operating arms relative to one another whereby extension movement of said uncoupling member continues beyond a position whereat certain of said latch pins are retracted until all of said latch pins are retracted even though said latch pins are displaced from their predetermined coplanar position, and two parallel fluid cylinders each of said fluid cylinders being operatively connected, one to each of said bar element intermediate the ends thereof for operating said unlatching member.

* * * * *